April 4, 1967 R. D. WALES 3,312,603

PRODUCTION OF OXIDIC FILMS ON GERMANIUM

Filed April 6, 1964 8 Sheets-Sheet 1

ROBERT D. WALES
INVENTOR.

BY

Owen, Wickersham & Erickson

April 4, 1967 R. D. WALES 3,312,603

PRODUCTION OF OXIDIC FILMS ON GERMANIUM

Filed April 6, 1964 8 Sheets-Sheet 2

ROBERT D. WALES
*INVENTOR.*

BY

Owen, Wickersham & Erickson

April 4, 1967 R. D. WALES 3,312,603

PRODUCTION OF OXIDIC FILMS ON GERMANIUM

Filed April 6, 1964

8 Sheets-Sheet 3

ROBERT D. WALES
INVENTOR.

BY

Owen, Wickersham & Erickson

ROBERT D. WALES
INVENTOR.

BY
Owen, Wickersham & Erickson

ROBERT D. WALES
INVENTOR.

BY
Owen, Wickersham & Erickson

April 4, 1967 R. D. WALES 3,312,603

PRODUCTION OF OXIDIC FILMS ON GERMANIUM

Filed April 6, 1964 8 Sheets-Sheet 6

ROBERT D. WALES
*INVENTOR.*

BY
Owen, Wickersham & Erickson

ROBERT D. WALES
INVENTOR.

BY
Owen, Wickersham & Erickson

April 4, 1967 R. D. WALES 3,312,603

PRODUCTION OF OXIDIC FILMS ON GERMANIUM

Filed April 6, 1964 8 Sheets-Sheet 8

ROBERT D. WALES
*INVENTOR.*

BY

Owen, Wickersham & Erickson

United States Patent Office 3,312,603
Patented Apr. 4, 1967

3,312,603
PRODUCTION OF OXIDIC FILMS ON GERMANIUM
Robert D. Wales, 3688 South Court, Palo Alto, Calif. 94306
Filed Apr. 6, 1964, Ser. No. 357,406
7 Claims. (Cl. 204—14)

This invention relates to the production of oxidic films on germanium.

Oxidic films on semiconductors are useful in the study and understanding of the surface properties of the semiconductors, in the study and understanding of new devices, and for providing insulation. On germanium, oxide films are useful as surface protection for existing germanium devices. They can also be used in the production of integrated circuits that use germanium and in the production of germanium surface veractors and other electrical devices. However, heretofore there have been no surface veractors or integrated circuits using germanium because there has been no satisfactory way of forming suitable germanium oxide films on germanium.

An object of the present invention is to provide a method of making suitable oxide films on germanium. This object is accomplished by a novel type of germanium anodization.

Previous study of the anodic oxidation of germanium in acid and alkaline aqueous solution, disclosed that a thin delicate film of germanium dioxide can be deposited in alkaline solutions when the solution becomes supersaturated, and that in some conditions in 0.1 N sulfuric acid or at not too high $OH^-$ concentration an orange deposit has been formed which is thought to be GeO. All these films have been very thin and were not practical for the uses described above. The germanium oxide films produced by such anodization have been soluble in the aqueous solution, so that it has been very difficult to produce any films at all in aqueous solutions. Somewhat better, but still rather thin germanium oxide films have been obtained by anodization in an electrolyte of anhydrous sodium acetate in glacial acetic acid; these films were between 220 and 1240 Angstroms thick and were produced by currents at densities between 66 and 240 microamperes per square centimeter; the current efficiencies lay between 10 and 20 percent, and field strength was in the range 700,000 to 3½ million volts per centimeter. These thin films, their low breakdown voltages, and the low current efficiencies have prevented the development of commercial germanium semiconductors with oxidic films on them.

Another object of the present invention is to produce relatively thick germanium oxide films, that is film thickness up to 7,000 Angstroms and even thicker. These may be formed with a differential field strength of around two million volts per centimeter and a current efficiency of around 80 percent. With this invention, the breakdown voltage at 250 microamperes per square centimeter is about 150 volts; at 100 microamperes per square centimeter the breakdown voltage is about 180 volts.

The marked improvements obtained by the present invention, as well as other objects and advantages, will appear from the following description of some preferred forms of the invention.

Figure 1:
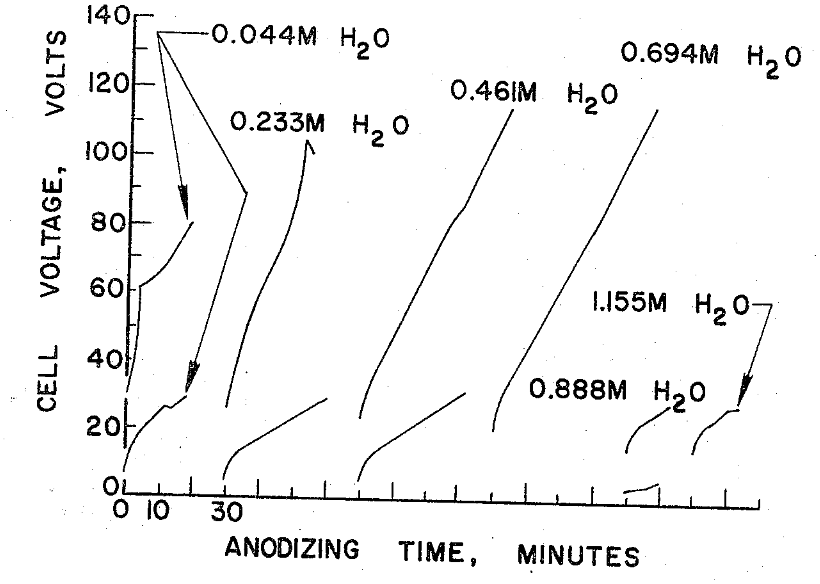
FIG. 1 is a graphical presentation of data obtained from anodic oxidation of polycrystalline germanium in a series of acetic anhydride media containing 0.4 mM. lithium nitrate and varying amounts of water in carefully controlled small quantities. The curves represent the anodizing time in minutes on the horizontal axis and the cell voltage in volts on the vertical axis.
Figures 3, 4:
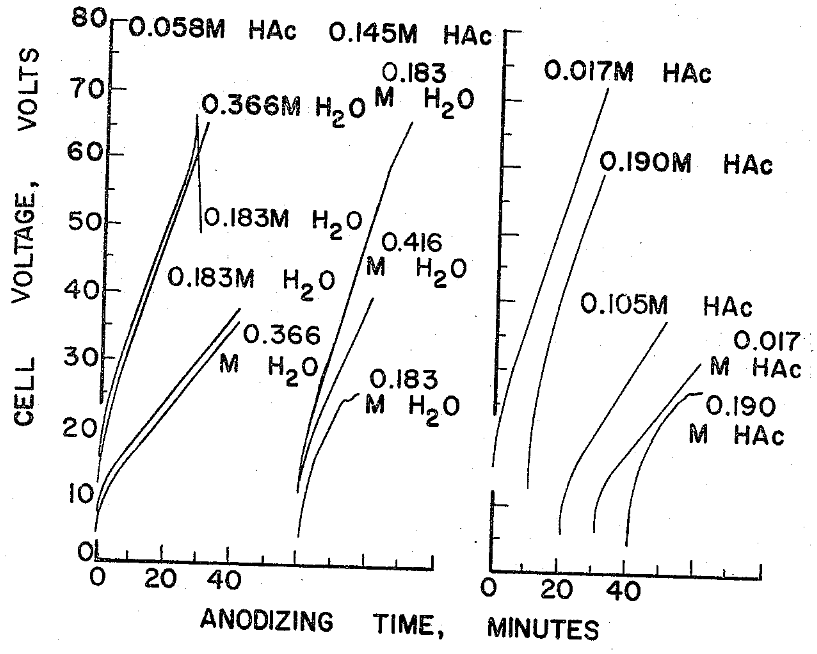

FIG. 3 is a view similar to FIG. 1 showing the results obtained from a series of runs in which the acetic anhydride contained 0.6 mM. lithium nitrate, acetic acid, and water. The curves at the left represent results where 0.058 M acetic acid was used and those at the right the results from 0.145 M acetic acid. For both amounts of acetic acid the amount of water was varied to give the different curves.

FIG. 4 is like FIG. 3, the difference being that the amount of water was held constant at 0.278 M $H_2O$, and the amount of acetic acid was varied.

Figures 5, 6:
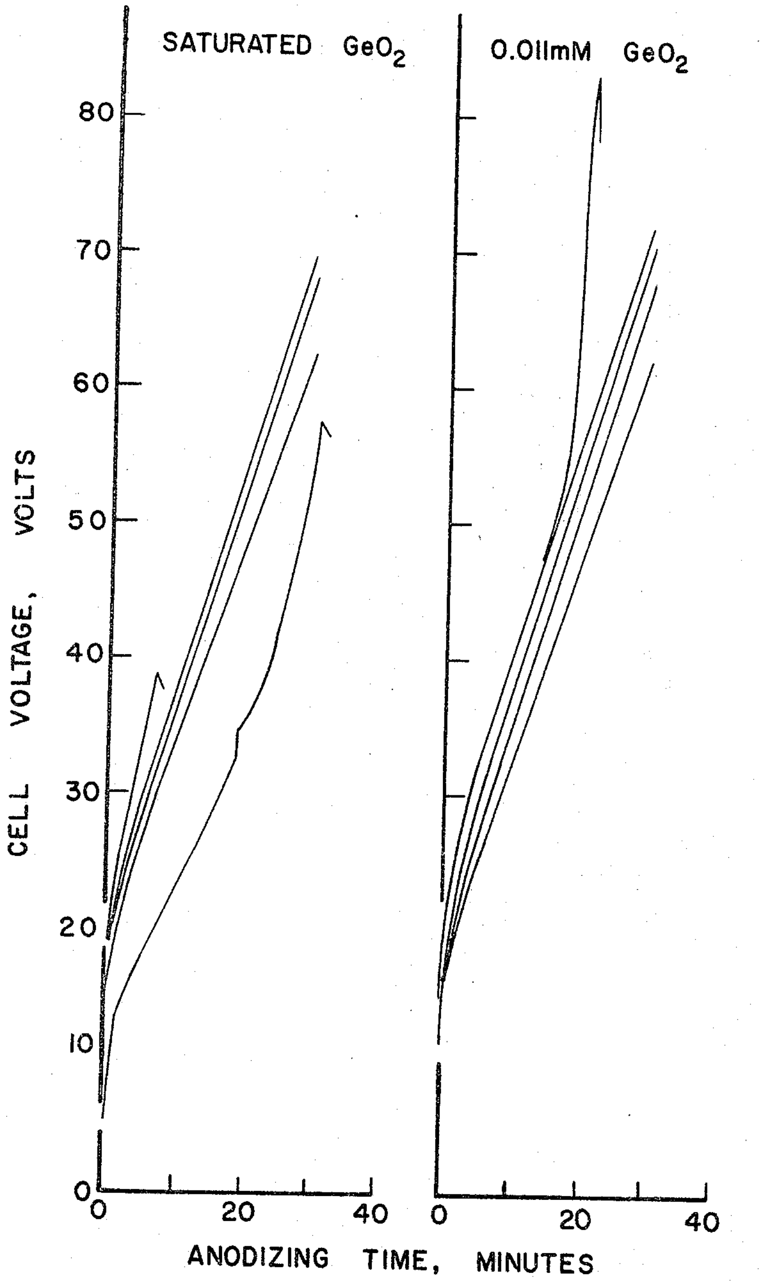

FIG. 5 is a similar diagram showing the effects when the acetic anhydride contains 0.6 mM. lithium nitrate, 0.105 M acetic acid, 0.278 M water, and a saturating amount of germanium dioxide. Two different current densities were used and, at one current density, the results were successively re-run to test for consistency.

FIG. 6 is like FIG. 5 except that less germanium oxide was used (0.011 mM. $GeO_2$) and only one current density was used.

Figure 7:
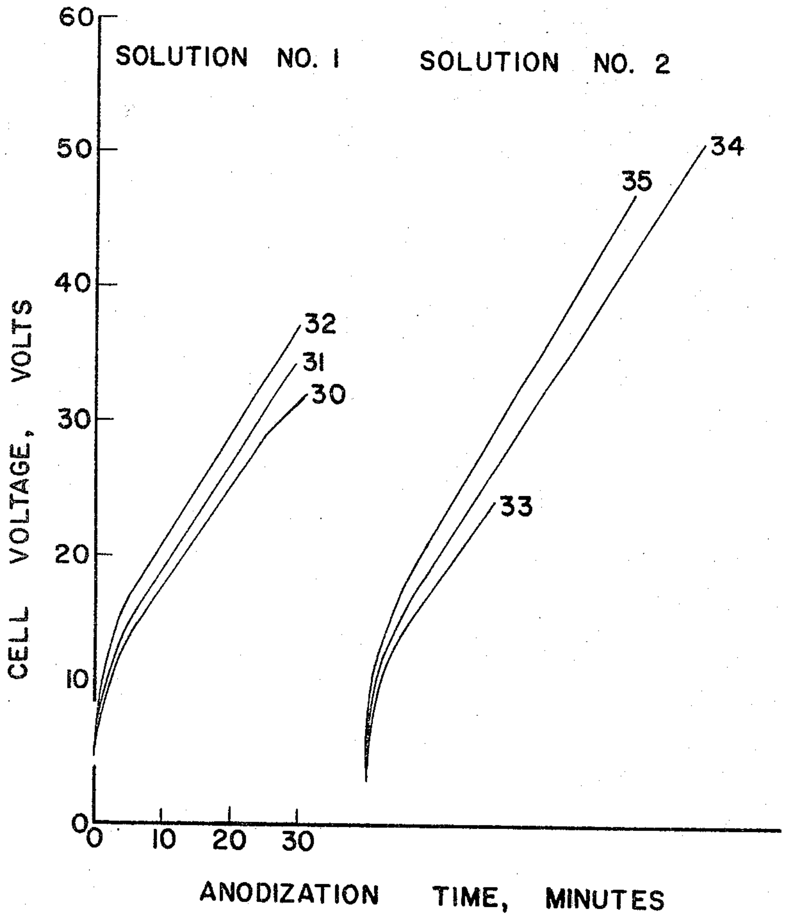

FIG. 7 is a similar diagram showing the effects obtained from acetic anhydride containing 0.6 mM. lithium nitrate, 0.105 M acetic acid, 0.278 M water, and 0.011 mM. germanium dioxide, at different anodization times and different ages of the solution.

Figure 8:
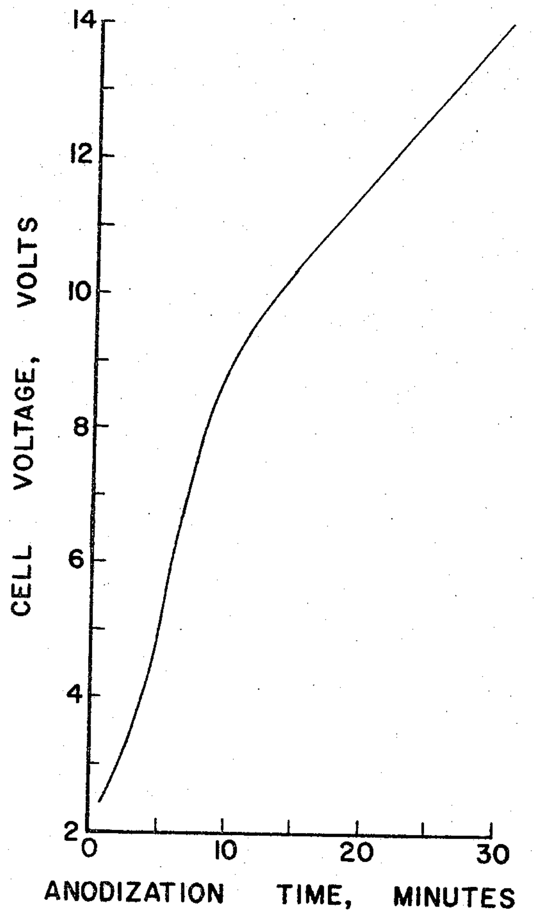

FIG. 8 is like FIG. 7, the curve showing an anomaly at the beginning of anodization.

Figure 9:
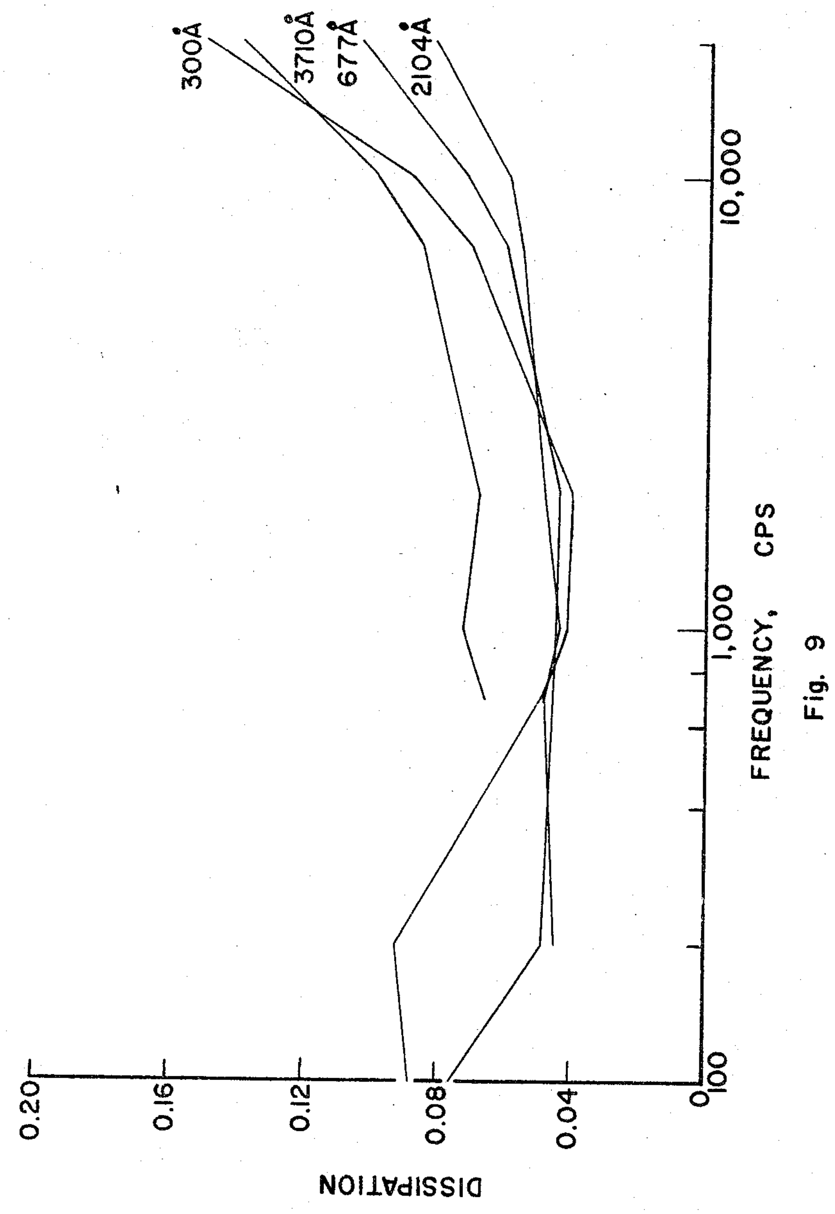

FIG. 9 is a graphical presentation of the variation of the dissipation factor with frequency for several thicknesses of dry anodically formed germanium dioxide films made by this invention.

Figure 10:
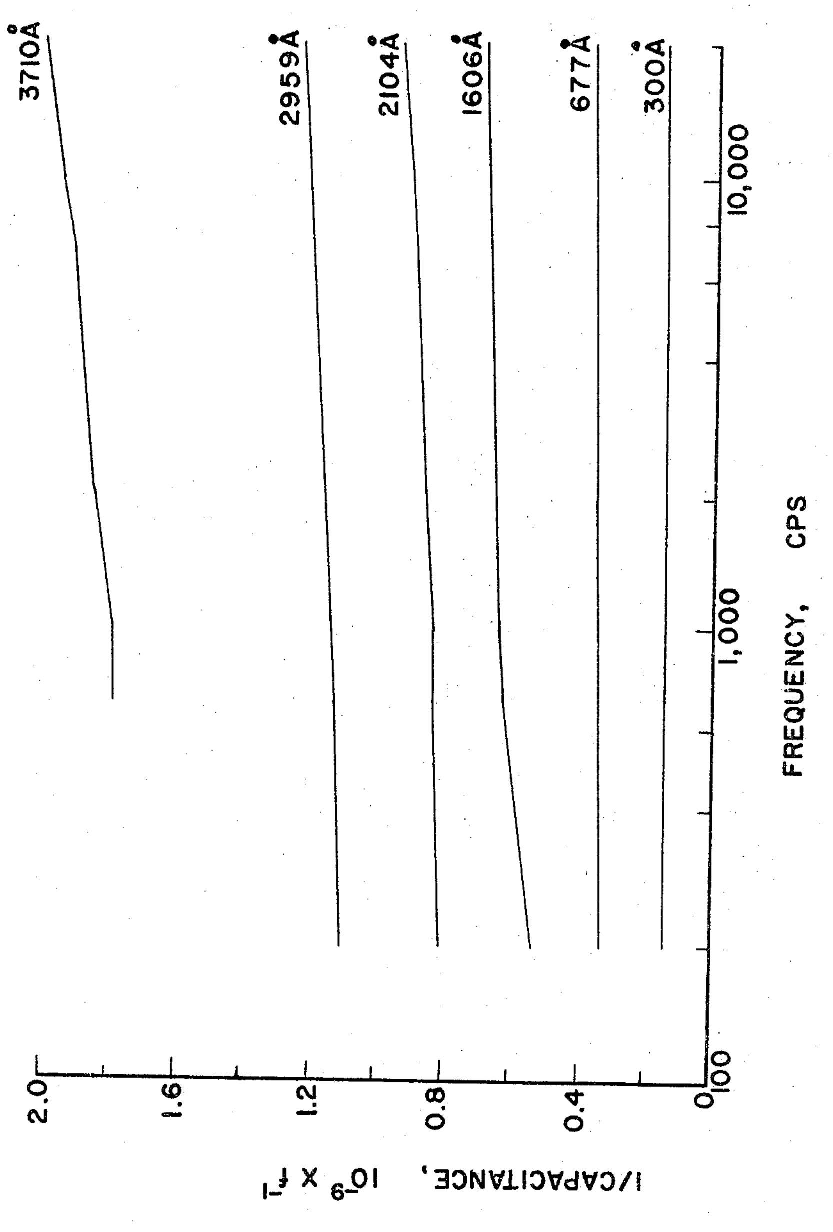

FIG. 10 is a graphical presentation of the variation of capacitance with frequency for several thicknesses of dry anodically formed germanium dioxide films made by this invention.

Figure 11:
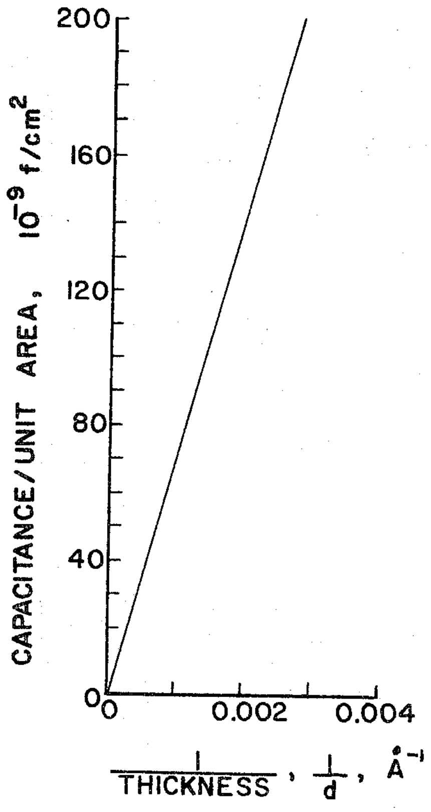

FIG. 11 is a graphical presentation of the variation of capacity with thickness at a frequency of one kilocycle for dry films of this invention.

A very important feature of the present invention is that it forms germanium oxide films by anodization in acetic anhydride. Acetic anhydride being a relatively poor conductor and not readily releasing oxygen, either a small amount of water or an electrolyte soluble in acetic anhydride are incorporated, and preferably both are added. Various electrolytes soluble in acetic anhydride may be used, such as lithium or potassium nitrate; lithium, sodium, or potassium and other chlorate; and many other salts such as alkaline halides and acetates, and many others. These increase the conductivity and in some instances supply some of the oxygen used to form the coating on germanium. Preferably, however, the oxygen is supplied by a small amount of water that is added to the acetic anhydride and which, I have found, reacts with it very slowly.

I have also found that there are advantages to employing small amounts of acetic acid as a reaction stabilizer, slowing down the tendency of the water to react with the acetic anhydride and thereby become less available for oxygen release.

In addition, I have found that when small amounts of germanium dioxide, preferably below saturation, are in solution in the acetic anhydride, the anodic film produced by this invention is hardened and has better value than if the germanium dioxide is not used.

The present invention enables the formation of oxidic films at room temperature, so that the characteristics of the germanium substrate are unaltered. Pertinent information concerning the film, such as differential field strength, thickness, and resistivity are readily obtained. The rate of film growth may be readily controlled, and thick amphorous films are easily obtained.

The films can be produced at room temperature in a cell similar to that described in Sheff, Gatos, and Zwerdling in the Review of Scientific Instruments, volume 29, page 531 (1958). The anode may be supported against a hole in the side of the cell of such a size that an electrode area of 0.6 square centimeter is obtained. A tantalum cathode may be used, and standard instruments may be used to measure the currents and voltages.

In the following examples, pieces of intrinsic polycrystalline germanium measuring ¼ inch by ¹⁄₁₆ inch by 2 inches were used without further machining. Those pieces which were used to study the effects of varying the amounts of water or acetic acid, or combinations of these were chemically polished in an etchant of 15 cc. acetic acid, 25 cc. concentrated nitric acid, 15 cc. of 48% hydrofluoric acid, and 0.3 cc. of bromine. After exposure to the etchant, these plates were rinsed, first with distilled water and then with acetone, were air dried, and were then used immediately. An orange-peel surface was obtained on all these samples. In all the other examples the germanium pieces were polished to a mirror finish, as by lapping them with 10-micron grit, and then polishing them on a silk cloth using distilled water and 0.3 micron high-purity alumina abrasive.

The following examples show the effects of using acetic anhydride and (for the sake of standardization) lithium nitrate as electrolyte and then either water (Example 1), acetic acid (Example 2), both water and acetic acid (Example 3), and both water and acetic acid and some germanium dioxide (Example 4).

*Example 1*

The series of curves of FIG. 1 were obtained from a series of runs using different amounts of water in combination with acetic anhydride containing dissolved electrolyte. The acetic anhydride, as in the other example, was 99.9% reagent material which was distilled, the center cut being retained and used. For purposes of obtaining comparative results a single electrolyte was used in all examples, namely lithium nitrate, which was also analytical reagent material, vacuum dried for 15 hours at 82° C. Other electrolytes could, of course, be used. The lithium nitrate was dissolved in water in various concentrations, such that in each instance the resulting acetic anhydride composition contained 0.4 mM. lithium nitrate, so that, in effect, only the amounts of water were varied. The amounts of water are shown in FIG. 1 for each curve, all expressed in molar quantities.

It was found that the reaction of water and acetic anhydride is fairly slow, that it decreases as the water concentration is decreased, and that it also decreases as acetic acid concentration is increased, acetic acid being used in subsequent examples.

FIG. 1 shows that too little water gave a poor voltage-time relationship and a low breakdown voltage, while too much water also gave a poor voltage-time relationship, probably because of the solubility of the oxidic film in the water. At about 0.233 M water a good voltage-time relationship was obtained at 100 microamperes per square centimeter, while breakdown occurred at about 85 volts at a current density of 500 microamperes per square centimeter. At 0.461 M and 0.694 M water, a small "step" was obtained in the voltage-time relationship at 500 microamperes per square centimeter.

*Example 2*

Figure 2:
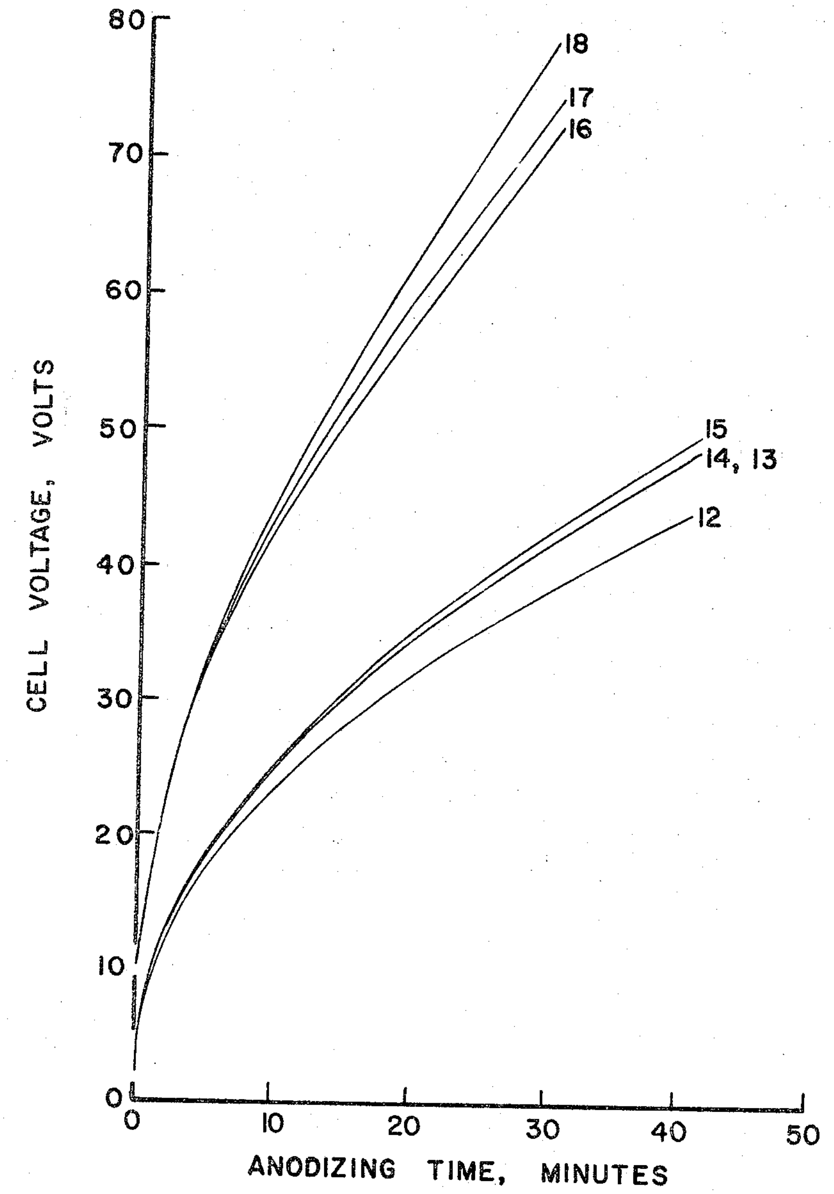
FIG. 2 is a view similar to FIG. 1 showing data obtained from a series of acetic anhydride media containing 0.7 mM. lithium nitrate and various amounts of acetic acid, without added water. Two different current densities were used to give the two sets of curves.

The series of curves of FIG. 2 were obtained when only acetic acid and 0.7 mM. lithium nitrate were added to the acetic anhydride. Reagent type of glacial acetic acid was refluxed with 10% acetic anhyride for several hours and then distilled, retaining and using the center cut. The voltage time curves shown in FIG. 2 are non-linear at current densities of both 100 and 250 microamperes per square centimeter. In this instance 0.7 mM. lithium nitrate was used and the acetic acid values were as follows for each of the seven curves.

TABLE I.—VARIABLES PRODUCING THE CURVES OF FIG. 2

| Curve | Acetic acid, M | Current density, μamp./cm.² |
|---|---|---|
| 12 | 0.058 | 100 |
| 13 | 0.117 | 100 |
| 14 | 0.262 | 100 |
| 15 | 0.175 | 100 |
| 16 | 0.262 | 250 |
| 17 | 0.175 | 250 |
| 18 | 0.058 | 250 |

*Example 3*

FIGS 3 and 4 show the voltage-time relationships when using various concentrations of *both* acetic acid and water in acetic anhydride, using 0.6 mM. lithium nitrate as an electrolyte. In FIG. 3, the acetic acid was kept constant at 0.058 M and the water was varied from 0.183 to 0.366 as labeled on the curves to produce the curves at the left hand side at two different current densities, 100 and 250 microamperes per square centimeter. The curves on the right hand side of FIG. 3 resulted from similar procedures with the acetic acid retained at 0.145 M. In FIG. 4, the water was kept at 0.278 M $H_2O$, and the acetic acid was varied as labeled on the curves. With 0.058 M acetic acid and 0.183 M water, a linear relationship was obtained at 100 microamperes/cm.², while breakdown was indicated at about 60 volts at 250 microamperes/cm.². Although the relationship in FIG. 3 for 0.366 M water does not indicate breakdown at the same voltage at 250 microamperes/cm.², it does indicate an anomaly in the microamperes per square centimeter relationship. With 0.145 acetic acid the FIG. 3 data indicated a fall-off of the voltage-time relationship for 0.183 M water at both 100 and 250 microamperes/cm.².

With 0.278 M water and between 0.017 M and 0.190 M acetic acid, the data shown in FIG. 4 indicated little change in the voltage-time relationship at 250 microamperes/cm.². At 100 microamperes/cm.² the voltage-time relationship fell off at 0.190 M acetic acid and was greater for 0.105 M acetic acid than for 0.017 M acetic acid.

*Example 4*

Having obtained already good results by using acetic anhydride containing both water and acetic acid together with the suitable electrolyte, a further improvement was found when some germanium dioxide was added to the acetic anhydride, in that the film became noticeably harder. I found that it is preferable to use a relatively small quantity of germanium dioxide, saturation giving poor results. Comparisons are shown in FIGS. 5 and 6, FIG. 5 showing the results with the $GeO_2$ at saturation and FIG. 6 the results with 0.011 mM. $GeO_2$. While the voltage-time relationships for the first two or three runs of each were similar, the saturated germanium dioxide solution gave poor results, the solution turning milky and the film being soft and nonadherent. By using 0.011 mM. germanium dioxide (FIG. 4), a hard film is obtained and the solution remains clear. The solutions in both instances employed 0.6 mM. lithium nitrate, 0.105 M acetic acid, and 0.278 M water in addition to the germanium dioxide, all in acetic anhydride.

Various tests were employed in order to study the efficiency, thickness, and differential field strength of the films produced by this invention. The amount of germanium in the film was determined by using a modification of a method disclosed by H. Newcombe et al. in Anal. Chem. vol. 23 No. 7, page 1023, July 1951. The back and edges of the electrodes were painted with a polystyrene type dope and air dried. The film was dissolved in 5 ml. of 0.01 N sodium hydroxide by immersion for 15 seconds. The solution was then made acid by the addition of 2 ml. of 0.05 N sulfuric acid and diluted up to about 10 ml. The other reagents were then added, as indicated by the Newcombe et al. article, and allowed to stand one hour before diluting to 25 ml. and running in a spectrophotometer at 540 milimicrons. The current in all runs was controlled to about 1% and the voltage was within about 2%.

The differential field strength $E_d$ at any thickness is defined as $$E_d=\frac{dV}{ds}=\frac{dV}{\beta\epsilon Idt}$$

where $s=s_0+\beta\epsilon It$; $s_0$ is thickness prior to electrolysis (taken as zero in this work), $\epsilon$ the efficiency, I the current density (amp/cm.$^2$), $t$ the anodizing time in seconds, $\beta$ the thickness of film in centimeters formed per amp-sec./cm.$^2$ of the charge passed leading to film formation. Assuming the density of amorphous germanium dioxide to be 3.637 g./cm.$^3$, the value of $\beta$ is $7.426\times10^{-5}$ cm.$^3$/(amp-sec.). The normalized slope of the voltage-time relationship is $dV/Idt$.

The efficiency, normalized slope, thickness, and differential field strengths are given for 12 runs in Table II. The data are for current densities of 25, 100, and 250 $\mu$a./cm.$^2$. The data indicate an average of 78±7% and an average differential field strength of $2.1\pm0.3\times10^6$ v./cm. The average normalized slope of the voltage-time relationship or $dV/Idt$ is 118±10 v./(amp-sec.).

TABLE III.—KEY TO FIG. 7

| Curve | Time between runs, minutes | Slope, dV/Idt |
|---|---|---|
| 30 | None | 121 |
| 31 | 12 | 131 |
| 32 | 14 | 139 |
| 33 | None | 121 |
| 34 | 174 | 131 |
| 35 | 11 | 143 |

A later series of runs gave normalized slopes of 119, 131, and 132 volts/amp sec. respectively as indicated by the normalized slopes in Table II. The values obtained at 250 microamperes/cm.$^2$ were somewhat lower and not very much different. The results indicate that one solution can be used at least four times in one day and cannot be kept more than one day.

At current densities of 250 $\mu$amp/cm.$^2$, breakdown occurs at about 150 volts in the "normal" manner, with a 10 to 20 volt fluctuation but no continual rise of voltage. At 100 $\mu$amp/cm.$^2$ breakdown occurs at about 180 volts, but the voltage begins to rise linearly with time at a much faster rate. It is postulated that at the lower current densities, the current is low enough with respect to the various rates to allow the continued formation of crystalline $GeO_2$ on the surface, whereas at the higher current densities, the current is great enough with respect to the various rates so that the crystalline $GeO_2$ film breaks down. For example, the film could break down because of local heating.

The crystalline material formed when the germanium is anodized to the breakdown voltage was found by X-ray analysis to be $GeO_2$. Infrared transmission data have indicated strongly bound water and no acetate ion in the amorphous film. There is a moderately sharp $GeO_2$ transmittance minimum at 869 cm.$^{-1}$ which may be usable for determination of film thickness.

TABLE II.—ANODIC OXIDATION OF POLYCRYSTALLINE GERMANIUM IN ACETIC ANHYDRIDE CONTAINING 0.6 mM $LiNO_3$, 0.105 M ACETIC ACID, 0.278 M WATER AND 0.011 mM $GeO_2$

[Anode area 0.600 cm.$^2$, temperature 26° C.]

| Run No. | The Electrochemical Parameters | | | | | |
|---|---|---|---|---|---|---|
| | Anodization time (t), min. | Current density (I), $\mu$amp./cm.$^2$ | Efficiency ($\epsilon$), percent | Normalized slope (dV/Idt), v./amp.-sec. | Differential field strength ($E_d$), v./cm.$\times10^{-6}$ | Thickness (s), A. |
| 1 | 20 | 100 | 78 | 121 | 2.1 | 700 |
| 2 | 20 | 100 | 79 | 124 | 2.1 | 710 |
| 3 | 30 | 100 | 59 | 131 | 3.0 | 790 |
| 4 | 30 | 100 | 74 | 121 | 2.2 | 990 |
| 5 | 30 | 100 | 77 | 108 | 1.9 | 1,040 |
| 6 | 30 | 100 | 80 | 139 | 2.3 | 1,070 |
| 7 | 132 | 25 | 82 | 114 | 1.9 | 1,200 |
| 8 | 40 | 100 | 90 | 93 | 1.4 | 1,600 |
| 9 | 30 | 250 | 61 | 114 | 2.5 | 2,030 |
| 10 | 50 | 100 | 94 | 131 | 1.9 | 2,080 |
| 11 | 30 | 250 | 77 | 112 | 2.0 | 2,580 |
| 12 | 30 | 250 | 87 | 108 | 1.7 | 2,890 |
| Average | | | 78±7 | 118±10 | 2.1±0.3 | ---------- |

It was found that no more than one or two satisfactory runs could be made in the same solution unless germanium dioxide was present in the solution, in which case several satisfactory runs could be made in the same solution. No satisfactory run could be made on solutions kept overnight unless more water was added before the run. FIG. 7 indicates the effect of anodization time and age on the solution, on the voltage-time relationship when solutions of acetic anhydride containing 0.6 mM. lithium nitrate, 0.105 M acetic acid, and 0.278 M water and 0.011 mM. germanium dioxide were used.

Films ranging in thickness from approximately 90 to 7000 A. have been formed with the expected interference color changes. As indicated by Vasicek in "Optics of Thin Films" page 137, Interscience Publishers, Inc., New York, 1960, the extremely thin films are clear, turning a brown-yellow as the thickness is increased, then traversing the regular order of interference colors. In Table IV, the colors of some of the anodic films produced on germanium are presented along with the colors given by Visicek for thickness as determined using a refractive index of 1.607 for amorphous germanium dioxide.

TABLE IV.—INTERFERENCE COLORS OBTAINED ON POLYCRYSTALLINE GERMANIUM ANODIZED IN ACETIC ANHYDRIDE CONTAINING 0.6 mM $LiNO_3$, 0.105 M ACETIC ACID, 0.278 M WATER, AND 0.011 mM $GeO_2$

| Films produced in this work | | Film colors as calculated from data of Vasicek using a refractive index of 1.607 | |
|---|---|---|---|
| Approximate Thickness, A. | Color | Thickness, A. | Color |
| 87±8 | Clear (white). | ---------- | |
| 174±15 | Faint brown-yellow. | ---------- | |
| 261±23 | Darker brown-yellow. | ---------- | |
| 348±31 | Brown-yellow. | ---------- | |
| 522±47 | Violet. | ---------- | |
| ---------- | | 653 | Brown-yellow. |
| 696±62 | Dark blue. | ---------- | |
| ---------- | | 784 | Purple. |
| | | 871 | Violet. |
| 872±78 | Light blue. | ---------- | |
| 1,043±93 | Blue white. | ---------- | |
| ---------- | | 1,108 | Blue. |
| 1,221±109 | Blue green. | ---------- | |
| ---------- | | 1,281 | Bluish white. |
| | | 1,431 | Greenish blue. |
| 1,461±131 | Yellow. | ---------- | |
| 1,566±140 | Orange (brown-yellow). | ---------- | |
| ---------- | | 1,593 | Yellowish white. |
| 1,739±156 | Red. | ---------- | |
| ---------- | | 1,756 | Yellow. |
| ---------- | | 2,048 | Brownish yellow. |
| 2,088±187 | Blue. | ---------- | |
| ---------- | | 2,400 | Purplish red. |
| 2,540±228 | Dark blue. | ---------- | |
| ---------- | | 2,700 | Blue. |
| 4,385±383 | Red white. | ---------- | |

The thickness figures in the left side of the column are approximations which are not too exact. A perfect comparison cannot be expected, since Vasicek did his work with films on glass in perpendicular white daylight. The films obtained in this work were on germanium, and their colors were determined in fluorescent light at an angle slightly off the perpendicular. Also, the true area was assumed to be equal to the apparent area, all of which are factors that tend to produce error. Nevertheless, the results are indicative.

Thus, acetic anhydride does enable the formation of good films of germanium dioxide on germanium.

In addition to the above examples, I have produced films of germanium dioxide on germanium by using lithium nitrate without water or any of the other ingredients in acetic anhydride. In other words, approximately the amounts noted of lithium nitrate were applied directly into the acetic anhydride. I have also done this with undried potassium chlorate, using a little acetic acid in acetic anhydride. Other electrolytes which are soluble in acetic anhydride may be used, including lithium, sodium and potassium chlorates, and some other chlorates, several acetates, chromates, chlorides, iodates, and other salts, not only of the alkaline metals but of other metals. The solubility of many salts in acetic anhydride is known from published articles and any of these appears to give satisfactory results. Even without salts or other electrolytes, I have obtained satisfactory films at high voltage in acetic anhydride containing a small amount of unreacted water.

*Anomalies.*—The voltage-time relationship is not linear down to zero time. As indicated in all the figures, there is an initial rapid rise of voltage with time. In FIG. 8, this is strikingly evident for a run at a current density of 25 μamp/cm.², which, assuming the same efficiency, is equivalent to a film thickness of about 90 A. before the voltage-time relationship is linear.

FIGS. 9, 10 and 11 show some of the electrical characteristics of films obtained by this invention. The differential field strength in the germanium dioxide is understood to be 2,100,000 volts per centimeter, and the resistivity $2.3\times10^{10}$ ohm-cm. Using the same quantities of the same materials as used in FIG. 7, with current densities between 25 and 250 microamperes/cm.², the film thicknesses were calculated using the previously determined current efficiency. Using commercial impedance bridges, with an oscilloscope as a null indicator and an audio signal generator to generate the frequency, capacitance and dissipation factors of the film were measured.

Mercury was found to give the best electrical contact with the dry oxidic film. The apparent area of the mercury contact was 0.036 cm.². A large-area contact of air dried conductive silver was found to be satisfactory as a contact to the polycrystalline germanium.

The variation of the dissipation factor with frequency for dry films is indicated in FIG. 9. The dissipation factor is apparently independent of film thickness and a non-linear function of the logarithm of the frequency between 100 and 20,000 c.p.s. The data indicate a minimum dissipation factor of approximately 0.04 at about 2,000 c.p.s. There is approximately a linear relationship with $f$ for frequencies greater than 2,000 c.p.s. and a linear relationship with $1/f$ for frequencies less than 2,000 c.p.s.

The variation of the capacitance with frequency for dry films is indicated in FIG. 10. There was a linear variation of the reciprocal capacitance with the logarithm of the frequency for most of the films, the capacitance decreasing by about 6% for a 100 fold increase in frequency. The series capacitance of the dry film is shown in FIG. 11 as it varies with film thickness.

The D.C. resistivity (at 1.60 volts) of several of the dry films is tabulated in Table V. The average value of the resistivity for the thinner films is $3.3\times10^{12}$ ohm-cm. The resistivity of anodically formed germanium oxidic films has been quoted to be approximately $2.3\times10^{10}$ ohm-cm. (2, 6) for wet films up to about 1,200 angstroms in thickness.

TABLE V.—THE RESISTIVITY OF ANODICALLY FORMED GERMANIUM OXIDIC FILMS

| Film Thickness d, A. | Resistance at 1.60 v. | Resistivity,* ohm-cm. |
|---|---|---|
| 872 | $9.0\times10^{8}$ | $3.7\times10^{12}$ |
| 1,461 | $1.6\times10^{9}$ | $4.0\times10^{12}$ |
| 1,566 | $9.0\times10^{8}$ | $2.1\times10^{12}$ |
| 4,385 | $9.0\times10^{10}$ | $74.0\times10^{12}$ |

* Contact area=0.036 cm².

Films of less than 500 angstroms in thickness are fairly porous while thicker films are indicated to have little porosity. The dielectric constant of the germanium dioxide films is estimated to be 8.2 at one kilocycle.

The dissipation factor probably can be represented by an equation of the type $$D=aw+b/w$$

where D is the dissipation factor, $w$ is $2\pi f$ ($f$=frequency), and $a$ and $b$ are constants. The reciprocal of the capacity increases linearly with the logarithm of the frequency, increasing about 6% for a 100 fold increase in frequency.

One skilled in this art will recognize that different quantities and proportions of materials may be used within the scope of this invention.

I claim:

1. A method of producing oxidic film on germanium comprising anodizing the germanium in a medium consisting essentially of acetic anhydride containing a small amount of unreacted water.

2. The method of claim 1 wherein said acetic anhydride also contains a small amount of electrolyte dissolved therein.

3. The method of claim 1 wherein said acetic anhydride also contains a small amount of acetic acid to delay the reaction of the water with the acetic anhydride.

4. A method of producing oxidic film on germanium comprising anodizing the germanium in a medium consisting essentially of acetic anhydride containing a small amount of oxygen containing electrolyte salt to increase conductivity and to supply the oxygen for film formation.

5. A method of producing oxidic film on germanium comprising anodizing the germanium in a medium consisting essentially of acetic anhydride containing small amounts of dissolved electrolytic salt, unreacted water, acetic acid and germanium dioxide.

6. The method of claim 5 in which said germanium dioxide is present in quantities well below saturation.

7. A method of producing oxidic film on germanium comprising anodizing at 25 to 500 microamperes per square centimeter the germanium in a medium consisting essentially of acetic anhydride containing 0.4 to 0.7 mM. $LiNO_3$, 0.04 to 1.2 M $H_2O$, 0.05 to 2.6 M acetic acid, and $GeO_2$ in an amount below saturation.

References Cited by the Examiner

UNITED STATES PATENTS

| | | | |
|---|---|---|---|
| 2,560,792 | 7/1951 | Gibney. | |
| 2,686,279 | 8/1954 | Barton | 204—56 X |
| 2,909,470 | 10/1959 | Schmidt | 204—56 X |

HOWARD S. WILLIAMS, *Primary Examiner.*

G. KAPLAN, *Assistant Examiner.*